Patented Mar. 26, 1940

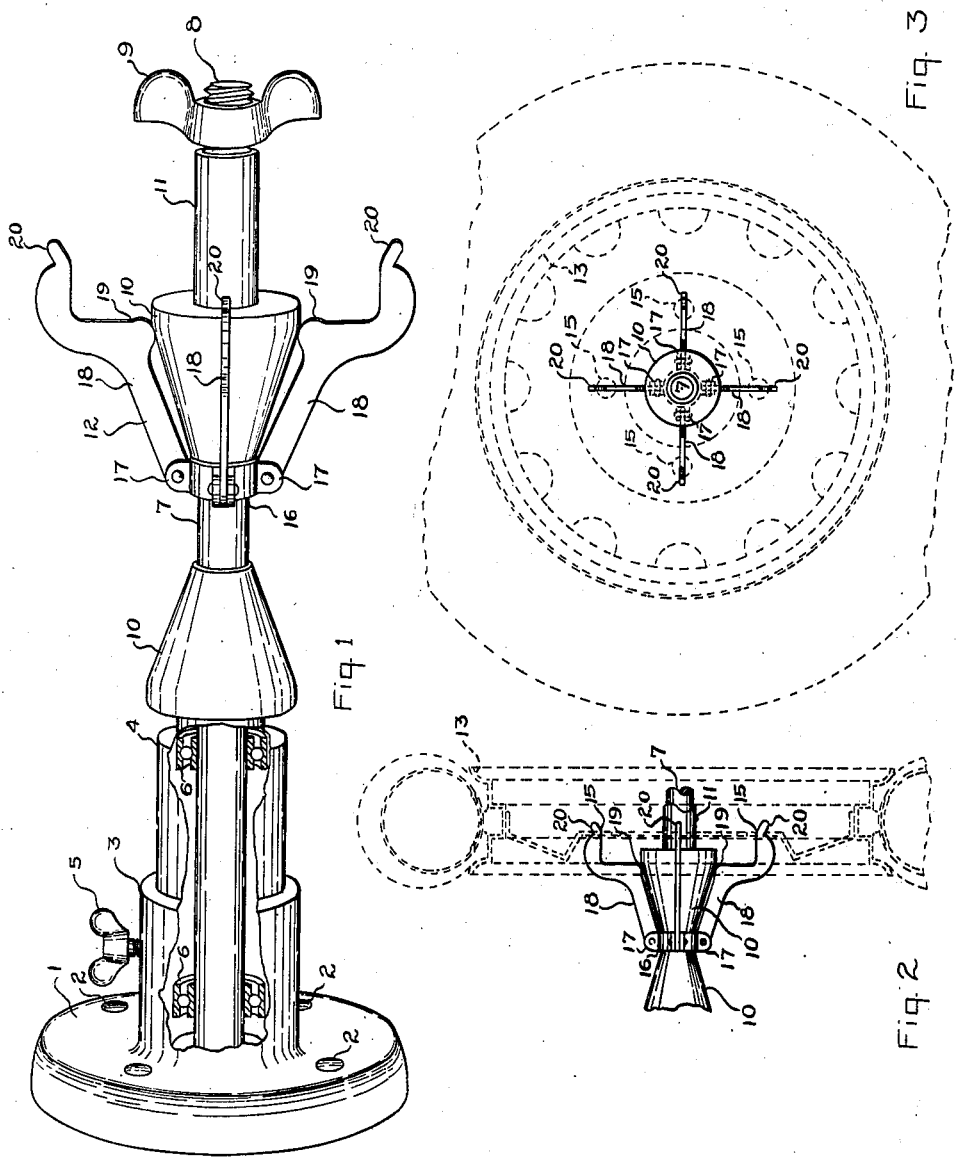

2,194,936

UNITED STATES PATENT OFFICE 2,194,936

WHEEL BALANCING APPARATUS

Paul F. Hatch, Ypsilanti, Mich., assignor to Harley C. Loney Company, Detroit, Mich., a corporation of Michigan Application March 25, 1936, Serial No. 70,793
Renewed July 9, 1938

1 Claim. (Cl. 144—288)

This invention relates to apparatus for balancing vehicle wheels and more particularly to a device for supporting a wheel for free rotation about its axis.

In supporting modern automotive vehicle wheels for free rotation so that the heavy point may be determined and balancing weights applied in any of the usual ways it is necessary that some support be provided to hold the wheel for rotation about its axis. The present invention provides such a device which in its preferred form engages the usual attachment bolt holes in the hub plate.

An object of the invention is to provide a wheel support which may readily be secured to the hub portion of a wheel.

Another object of the invention is to provide a wheel support for supporting a wheel from its hub plate.

A further object of the invention is to provide a wheel support having a plurality of corradiating fingers, the angle of corradiation of which may be varied to clamp the wheel thereon.

These and other objects will be apparent from the following specification when taken with the accompanying drawing in which Fig. 1 is a perspective view of the balancing apparatus, Fig. 2 is a side view of the wheel supporting portion with a wheel in place, and Fig. 3 is an end view of the wheel supporting portion with a wheel in place.

Referring particularly to the drawing, the reference character 1 indicates a base in which the balancing device is supported. The base 1 is provided with bores 2 through which bolts or screws may be passed for securing it to the wall or the side of a bench. The base 1 which preferably is a casting has an integral laterally projecting socket 3 in which is received a cylindrical sleeve 4. A thumb screw 5 secures the sleeve 4 in the socket. Internally of the sleeve 4 are disposed bearings 6 in which is rotatably supported the spindle 7 provided at its outer end with a threaded portion 8 on which is secured a wing nut 9.

Inwardly from the outer end of the spindle 7 are disposed two cones 10 having their converging ends adjacent each other. The cones are for the purpose of having supported thereon a wheel having a generally cylindrical hub, the cones being clamped into each end of the hub by the wing nut 9 bearing against the spacing sleeve 11, and the entire assembly at the same time being clamped against the outer bearing 6.

For use in cases wherein a wheel to be balanced does not have a usual elongated hub to which the cones 10 may be clamped, there is provided, according to the present invention, an adaptor 12 arranged to support a wheel 13 such as is shown in Figs. 2 and 3 from the usual holes 15 for receiving the projecting securing bolts by which the wheel is secured to the vehicle.

The adaptor 12 has an annular base 16 having a plurality of pairs of radially extending ears 17. Pivoted between each pair of ears 17 is an arm 18 having a camming abutment 19 and a supporting finger 20. The internal opening of the annular base 16 is slightly larger than the diameter of the spindle 7 so that it may slide thereon, as shown in the drawing. When assembling the adaptor 12 on the balancing device the wing nut 9, the spacing sleeve 11 and the outer cone 10 are removed and the adaptor is slipped on the spindle 7. The outer cone 10, the sleeve 11 and the wing nut 9 are then assembled on the spindle in the order named. The device is then ready for receiving the wheel. The arms 18 are spaced so that the fingers 20 are approximately located to simultaneously be received in the bolt holes 15 of the wheel. The fingers 20 are then manually inserted in the bolt holes 15 and the wing nut 9 is then screwed up. The later action forces the outer cone 10 inwardly so that it acts against the camming abutments 19 of the arms 18 to cam all of the fingers 20 outwardly. It should be observed that the fingers 20 are slightly outwardly extending or hook shaped and therefore positively hold the wheel against removal.

It will be understood that the design of the arms 18 and abutments 19 is such that the end of the outer cone does not enter the adaptor sufficiently to engage the base 16 prior to the fingers 20 being rigidly clamped in the bolt holes of the wheel. Usually the end of the outer cone will be spaced from the base 16 with the adaptor clamped in position within the bolt holes of the wheel. In the case of oversize wheels, a different size adaptor will have to be used, as it should be apparent that if the arms 18 may be radially carried by the outer cone to a point permitting engagement with the base 16, no clamping action will result. In operation, the adaptor is urged against the abutment presented by the inner cone by the indirect clamping action of the outer cone through the arms 18.

Figs. 2 and 3 illustrate a wheel mounted on the adaptor 12 for balancing. As the spindle 7 is mounted on bearings the wheel 13 in its mounted position is freely rotatable and will accordingly find a position of rest with its heavy side down. The wheel may then be balanced by any known method of attaching balancing weights but preferably is balanced according to the method disclosed in the copending application of James W. Hume, Serial No. 704,203, filed December 22, 1933.

While the adaptor 12 has been shown with four arms 18 it may have as many as desired although there would be no advantage in having more than the number of bolt holes 15. Also, instead of, as shown, the fingers 20 may engage the inner edge of the hub opening of the wheel. It is preferred however that the fingers 20 engage the securing bolt holes for the reason that they are more accurately disposed in the wheel with respect to its rotational axis and accordingly more accurate balancing is obtained. The invention is also capable of other modifications within its scope and I therefore do not wish to be limited except by the scope of the following claim.

I claim:

An adaptor for concentrically supporting a vehicle wheel, through engagement with the bolt holes of the mounting flange, upon a double cone wheel balancing fixture or the like having a freely rotating spindle, said adaptor consisting solely of a central collar apertured to receive said spindle, the inner face of said collar functioning as an abutment for engagement with a shoulder upon said spindle, and a plurality of corradiating arms pivotally supported at their inner ends upon said collar, said arms having at their outer ends notched finger portions for engagement with portions of said mounting flange from within said bolt holes, protuberant portions upon the inner sides of said arms between the ends thereof to form cam abutments for freely engaging along and around the conical surface of the outer cone of the balancing fixture, said cam abutments being located and shaped to give clearance between said outer cone and all other portions of said arms upon relative axial movement between said outer cone and the adaptor when said adaptor is used for balancing wheels of a predetermined bolt circle diameter range, whereby said arms are caused to move radially outward to concentrically clamp said wheel upon said spindle through the radial expanding action of said finger portions and the bolt holes.

PAUL F. HATCH.